Patented Aug. 18, 1953

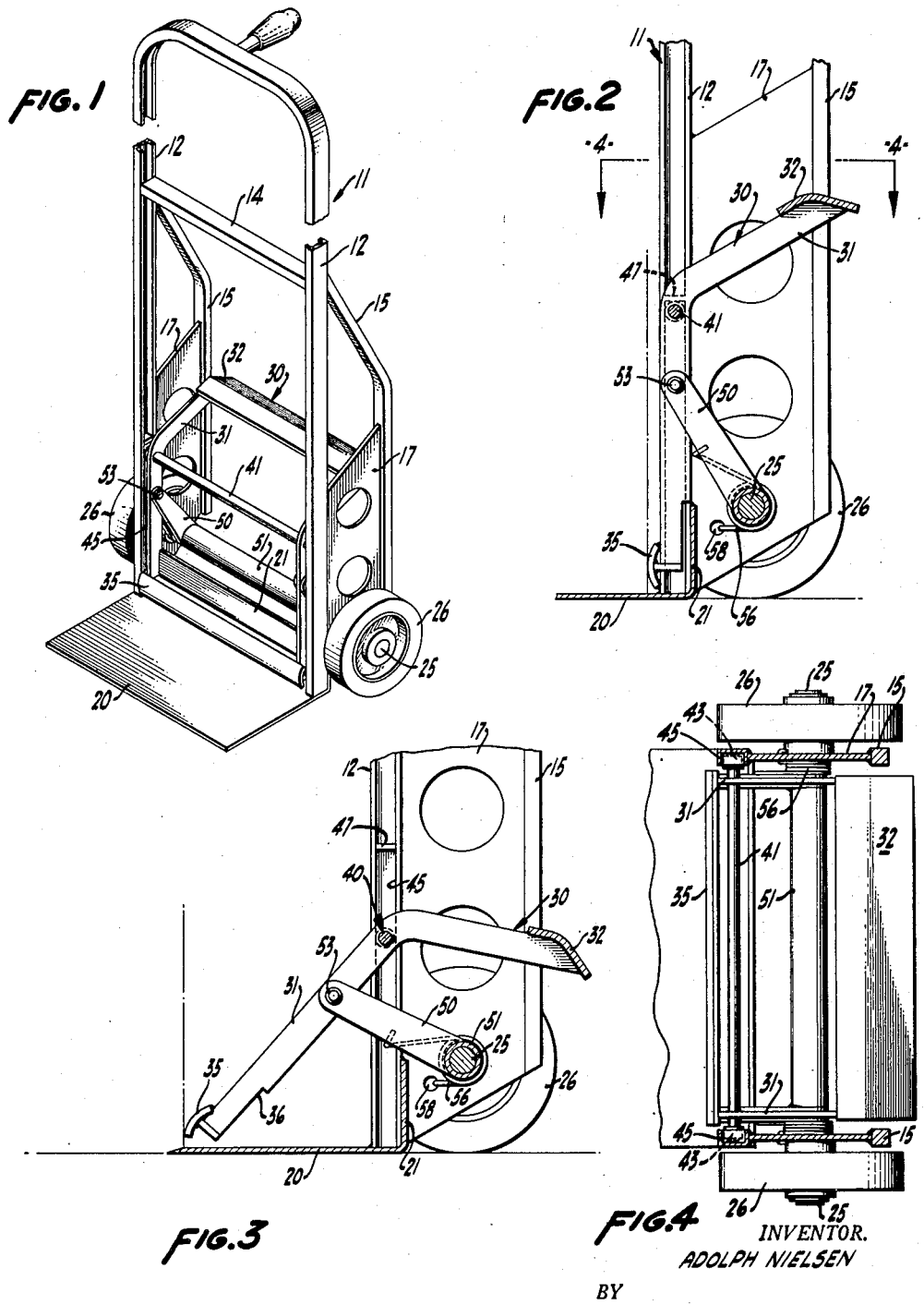

2,649,219

UNITED STATES PATENT OFFICE 2,649,219

HAND TRUCK

Adolph Nielsen, Oakland, Calif.

Application December 18, 1950, Serial No. 201,433

3 Claims. (Cl. 214—511)

1

This invention relates to hand trucks of the two-wheel type for use in trucking crates, boxes, cartons and the like.

It is a principal object of the present invention to provide an improved hand truck of the character described which is equipped with simple and efficient unloading mechanism.

Another object of the present invention is to provide unloading mechanism on a hand truck, which unloading mechanism is so constructed and arranged that the operator may quickly and easily unload large and heavy loads with a minimum of effort.

Another object of the present invention is to provide an unloading mechanism for a hand truck of the character described, which unloading mechanism is at least partly supported from the axle on which the wheels of the wheeled truck are mounted, thereby relieving the frame of part of the load imposed on the frame at the time that an unloading operation occurs.

A further object of the present invention is to provide a hand truck having an unloading mechanism in which the push off bar is moved in approximately a straight line by mechanism comprising fewer parts than required by prior constructions.

Another object of the present invention is to provide a hand truck having a foot bar constructed and arranged so that there is no danger of the foot of the operator slipping off the foot bar during unloading operations.

One form which the invention may assume is exemplified in the following description and illustrated by way of example in the accompanying drawings, in which:

Fig. 1 is a perspective view of a hand truck embodying the preferred form of my invention.

Fig. 2 is a fragmentary view in longitudinal section through the truck shown in Fig. 1, showing the manner of mounting the unloading mechanism, and showing the unloading mechanism in its normal position.

Fig. 3 is a view similar to Fig. 2 showing the unloading mechanism in the position which it will occupy when a load has been unloaded.

Fig. 4 is a cross-sectional view in plan along lines 4—4 of Fig. 2.

Referring to the accompanying drawings the truck comprises a rigid open frame generally designated by the reference numeral 11 and shown as being substantially rectangular in form and comprising longitudinal side frame members 12 connected by transverse frame members 14. Frame 11 also includes rearwardly extending

2 reinforcing members 15 joined to longitudinal side frame members 12 by webs 17. There is a platform or nose 20 extending or projecting from the front of frame 11 and this platform may be provided by suitably bending a plate and fastening the plate to the side frame members 12 by an upwardly extending portion 21 of the plate. The platform 20 itself is preferably fastened to the lower end of side frame members 12, such as by welding or the like, as shown is Fig. 3.

There is a stationary axle 25 secured adjacent its ends to the webs 17 so that the ends of the axle protrude outwardly from the webs 17. Truck wheels 26 are suitably mounted on the protruding end of the axle 25, preferably mounted by the use of ball bearings.

The unloading mechanism comprises a lever generally designated by the reference numeral 30, which lever comprises transversely spaced side members 31 joined at their rear upper ends by a foot bar 32 and at their lower forward ends by a pushoff bar 35. The side members 31 are preferably recessed at 36 so that they may accommodate the portions 21 when in their normal position as shown in Fig. 2. The pushoff bar 35 has an arcuate outer face so that it may easily ride against the load during the pushoff operation.

Lever 30 is operatively connected to frame 11 by pivots 40 which are provided by a cross bar 41 which extends across the lever 30 and is joined adjacent its outer ends to the side members 31 of lever 30. The protruding ends of cross bar 41 provide pivots 40 and pivots 40 have rollers 43 mounted thereon, said rollers being received within vertical guides 45 which are shown as being of channel shape (see Fig. 4). There are stops 47 at the top of guides 45 to limit upward movement of the rollers 43 within the guides 45. In the form of the invention disclosed, the side frame members 12 take the form of channel sectons. However, it is contemplated that the side frame members may take the form of tubular members, in which case vertical guides 45 would be fixed to the lower end of the tubular side frame members.

Lever 30 is mainly supported by arms 50, which are transversely spaced and fastened at their inner ends to a sleeve 51 adjacent the ends of the sleeve, said sleeve being rotatably received by axle 25. There are two pairs of arms 50 as best seen in Fig. 1. The outer ends of arm 50 are pivoted at 53 to the side members 31 intermediate the ends of the side members. It will be noted that the arms 50 are located closely adjacent the wheels of the hand truck so that the load imposed by the arms 50 onto the axle 25 can be taken more directly through the wheels than if the arms were located near the center of the axle 25. Therefore, by this construction a greater load capacity of the truck is provided.

Torsion springs 56 are provided for the purpose of urging the lever 30 to move to the position shown in Fig. 2, that is, its normal position. Torsion springs 56 have one set of ends bent and hooked through aperture 58 provided in webs 17 (see Fig. 3). The central coiled portions of torsion springs receive the ends of sleeve 51 extending beyond arms 50 and are supported thereby. The other set of ends of torsion springs 56 are bent and hooked around the outer arms of the pairs of arms 50. The torsion springs will be deformed when the lever 30 is moved from position shown in Fig. 2 to position shown in Fig. 3, so as to create a force sufficient to cause the lever to return to the position shown in Fig. 2. The torsion springs are originally arranged to be deformed in the position shown in Fig. 2, so that there will be sufficient force in the springs to cause the lever to always assume the position shown in Fig. 2 when there are no forces imposed on the foot bar 32.

It will be appreciated that by the above construction and mounting of lever 30 and the provision of arms 50 which are mounted on axle 25 that an unloading mechanism has been provided which allows heavy loads to be easily and quickly unloaded with a minimum of effort. Furthermore, an important advantage in applicant's construction is obtained by this particular unloading mechanism which provides for approximately straight-line movement of the pushoff bar 35 from its position shown in Fig. 2 to the position shown in Fig. 3 with a minimum number of parts necessary for obtaining this result. Also the rollers 43 on pivots 40 allow for easy rolling contact between the roller and the guides 45 during an unloading operation.

The novel unloading mechanism of the present invention is also constructed so that the load which is normally entirely imposed on the side frame members 12 is largely relieved from the side frame members 12 and imposed on the axle 25 at points on the axle very close to the supporting wheel 26. By the provision of a foot bar 32, which extends completely across the rear of the hand truck, there is no danger of the foot of the operator slipping off the foot bar as is possible in prior constructions.

Having thus described my invention, what I claim and desire to obtain by Letters Patent is:

1. A hand truck comprising, a frame having wheels supported at one end of the frame by an axle, a platform for the frame, means for pushing a load off the platform including a lever comprising transversely spaced side members joined at one end by a transversely extending foot bar and at the other set of ends by a pushoff bar, means supporting the lever including pivots having rollers thereon received in vertical guides on the frame and arms swingable about the axle, said arms being pivoted to the side members of the lever intermediate the ends of the lever, and resilient means for urging the lever in one direction.

2. A hand truck comprising, a frame having wheels supported at the base thereof, a platform at the bottom of the frame, a fixed vertical guide on said frame, a lever having a foot pedal at one end and a push-off bar at the other end and guide engaging means intermediate said ends engaging said vertical guide, an arm rotatably mounted on the base of said frame and pivotally connected to said lever intermediate the push-off bar and guide engaging means, and resilient means constantly urging said lever to a position where the foot pedal is elevated.

3. A hand truck comprising, a frame having an axle at the base thereof, wheels rotatably supported by said axle, a platform at the bottom of the frame, a fixed vertical guide on said frame, a lever having a foot pedal at one end and a push-off bar at the other end and guide engaging means intermediate said ends engaging said vertical guide, an arm rotatably mounted on the axle and pivotally connected to said lever intermediate the push-off bar and guide engaging means, and resilient means constantly urging said lever to a position where the foot pedal is elevated.

ADOLPH NIELSEN.

References Cited in the file of this patent

UNITED STATES PATENTS

| Number | Name | Date |
|---|---|---|
| 528,443 | Randall | Oct. 30, 1894 |
| 1,525,444 | Gignac | Feb. 10, 1925 |
| 1,542,023 | Alexander | June 16, 1925 |
| 1,760,509 | Marvel | May 27, 1930 |
| 2,310,284 | Gurries | Feb. 9, 1943 |
| 2,406,158 | Newport | Aug. 20, 1946 |
| 2,452,258 | Nielsen | Oct. 26, 1948 |
| 2,476,202 | Lozon, Sr. | July 12, 1949 |
| 2,583,977 | Turner | Jan. 29, 1952 |